(12) United States Patent
Grove-Nielsen

(10) Patent No.: US 9,234,497 B2
(45) Date of Patent: Jan. 12, 2016

(54) ROTOR BLADE FOR A WIND TURBINE

(75) Inventor: Erik Grove-Nielsen, Roslev (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 483 days.

(21) Appl. No.: 13/490,581

(22) Filed: Jun. 7, 2012

(65) Prior Publication Data

US 2012/0315145 A1 Dec. 13, 2012

(30) Foreign Application Priority Data

Jun. 10, 2011 (EP) .................. EP11169521

(51) Int. Cl.
*F03D 1/06* (2006.01)
*F03D 1/00* (2006.01)

(52) U.S. Cl.
CPC ............. *F03D 1/001* (2013.01); *F03D 1/065* (2013.01); *F03D 1/0658* (2013.01); *F03D 1/0691* (2013.01); *F05B 2240/40* (2013.01); *F05B 2240/80* (2013.01); *F05B 2240/90* (2013.01); *Y02E 10/721* (2013.01); *Y02E 10/728* (2013.01)

(58) Field of Classification Search
CPC ..... F03D 1/0633; F03D 1/0641; F03D 1/065; F03D 1/0675; F03D 1/0683; F03D 1/0691; F03D 1/0658; F03D 1/001
USPC ...... 416/204 R, 204 A, 205, 207–209, 214 R, 416/214 A, 219 A, 220 A, 239, 244 R, 244 A, 416/248, 174, 241 A, 229 R, 230, 226
See application file for complete search history.

(56) References Cited

U.S. PATENT DOCUMENTS

| 4,260,332 A | 4/1981 | Weingart et al. |
| 4,412,784 A * | 11/1983 | Wackerle et al. ............ 416/230 |
| 4,915,590 A * | 4/1990 | Eckland et al. ............ 416/229 R |
| 2007/0065288 A1* | 3/2007 | Sorensen et al. ............. 416/222 |
| 2009/0324420 A1* | 12/2009 | De La Rua et al. ............ 416/248 |
| 2011/0044817 A1* | 2/2011 | Bendel et al. ............ 416/204 R |
| 2012/0045343 A1* | 2/2012 | Hancock et al. ............. 416/226 |

FOREIGN PATENT DOCUMENTS

| CN | 100402374 C | 7/2006 |
| CN | 101970860 A | 2/2011 |
| DE | 10011464 C1 | 8/2001 |
| EP | 1959129 A2 | 8/2008 |
| FR | 2863321 A1 | 6/2005 |
| WO | WO 03/057457 A1 * | 7/2003 |
| WO | WO 2009/132612 A1 * | 11/2009 |

* cited by examiner

*Primary Examiner* — Christopher Verdier

(57) ABSTRACT

A rotor blade for a wind turbine is provided. The rotor blade includes an elongate blade base body with a number of connecting elements each having at least one axially extending connecting portion adapted to be connected with at least one corresponding connecting portion of a rotor hub of a wind turbine, wherein the respective connecting elements are connected to at least two circumferentially extending connecting members with the connecting members being adjacently disposed in circumferential direction so as to build a ring-like shape. Further, a wind turbine with such a rotor blade is provided.

15 Claims, 3 Drawing Sheets

ROTOR BLADE FOR A WIND TURBINE

CROSS REFERENCE TO RELATED APPLICATIONS

This application claims priority of European Patent Office Application No. 11169521.9 EP filed Jun. 10, 2011. All of the applications are incorporated by reference herein in their entirety.

FIELD OF INVENTION

The invention refers to a rotor blade for a wind turbine, having an elongate blade base body with a number of connecting elements each comprising at least one axially extending connecting portion adapted to be connected with at least one corresponding connecting portion of a rotor hub of a wind turbine.

BACKGROUND OF INVENTION

Rotor blades for wind turbines are usually built as fibre-reinforced hollow composite structures. Hence, they are usually fabricated by impregnating respective aligned and orientated fibres or fibre clutches with a casting or resin material respectively. Respective connecting elements in the shape of studs or the like having respective connecting portions such as threaded holes are integrated within the casting material so as to provide an interface for a mechanical connection with respective corresponding connecting portions of a rotor hub such as threaded bolts or the like.

Thereby, removing of the cast rotor blade from the mould is oftentimes problematic since particularly in the region of the ring-like shaped root of the blade ovalisation may occur due to the self-weight of the rotor blade. Respective ovally shaped or deformed rotor blades are difficult to machine and particularly difficult to mount on a respective rotor hub of a wind turbine.

It has been proposed to strengthen the blade root by inserting respective metal rings in the region of the blade root while or before moulding. Another proposal to enhance the mechanical properties, in particular the stiffness of the blade root is to provide bulky circular plates with the blade root. This principle is of particular disadvantage regarding the manufacturing process of vacuum injection since the circular plates impair the insertion of a respective mandrel for injecting the casting material. Another proposal was to provide the blade root with additional material, i.e. increase wall thicknesses, etc. in the blade root.

The respective approaches for strengthening respective blade roots are deemed as comparatively cumbersome and costly.

SUMMARY OF INVENTION

It is an object of the invention to provide a rotor blade having a constructively simple design with enhanced mechanical properties in the region of the blade root.

This is achieved by a rotor blade as has been initially described, wherein the respective connecting elements are connected to at least two circumferentially extending connecting members with the connecting members being adjacently disposed in circumferential direction so as to build a ring-like shape.

The present invention is based on the idea to provide the blade root of a rotor blade with enhanced mechanical properties, i.e. particularly enhanced stiffness, by means of at least two respective connecting members being connected with the respective connecting elements, i.e. studs or the like. The connecting members are inserted in between respective fibres and/or the casting material of the rotor blade while moulding.

The respective connecting members are of particular advantage when using segmented moulds or mould halves, e.g. for separately moulding two halves of a rotor blade which is oftentimes necessary for manufacturing large-scaled rotor blades. It is possible that the connecting members have to be machined before moulding.

The respective connecting members act as connecting means for aligning the respective connecting elements in a given geometrical relationship. Each of the connecting members is preferably provided with a respective number of connecting elements. In favour, the total number of connecting elements is uniformly distributed over the respective connecting members, i.e. in the exemplary case of two connecting members each connecting member is connected with half of the total number of connecting elements.

Generally, the respective connecting members are disposed in the region of the blade root. Yet, the concrete position of a respective connecting member may differ, whereby different strengthening effects may be accomplished in dependence of the radial position of the connecting members with respect to the centre axis of the rotor blade. Generally, the respective connecting members provide the blade root with additional mechanical stability, i.e. in particular stiffness so that ovalisation or deformation effects are avoided or at least reduced. Particularly, the respective connecting member is adapted to transfer and/or distribute respective externally applied loads into the blade root structure of the rotor blade.

In either case, the respective connecting members are circumferentially adjacently disposed so as to build a ring-like shape. Thereby, a slight circumferential gap may be provided between the respective connecting members or the connecting members may be placed as a joint, i.e. in direct circumferential abutment.

A connecting member may have the shape of a cylinder-segment, particularly a half-cylinder-segment, or a ring-segment, particularly a half-ring-segment. In such a manner, the connecting members have a ring-segment-like cross-section capable of encountering respective externally applied forces and capable of inhibiting any deformation or ovalisation effects of the blade root. Connecting members with respective shapes provide a huge surface so that respective loads may be distributed over an enlarged area leading to a reduction of stress. Aside, the transport of shear forces from the connecting member in the blade root is improved due to the large surface area of the respective connecting members. Hence, the connecting member is adapted to transfer externally applied loads, particularly shear loads, in the blade root of the rotor blade.

It is possible that the connecting elements are integrally built with a respective connecting member or mounted to a respective connecting member. In either case a mechanically stable connection of a respective connecting member and respective connecting elements is given. In dependence of the material of the connecting member and the connecting elements, an integral, particularly casting, construction of both the connecting member and the connecting elements may be realised leading to additional mechanical stability. Alternatively, the respective connecting means may be mounted, ie firmly attached to a respective connecting member. In this case, respective corresponding connecting portions are provided for achieving a mechanically stable connection of the connecting members and the connecting elements. The connection may be detachable or non-detachable. Welding or bolted connections are applicable for providing a connection of a connecting member and respective connecting elements for instance.

In a further embodiment of the invention, a respective connecting member may comprise radially spaced connecting member elements, whereby the connecting elements are disposed between the respective connecting member elements. Hence, a sandwich-construction is given, whereby the connecting member elements, which usually are shaped as ring- or cylinder segments, serve as outer layers and the connecting elements interconnecting the connecting member elements in radial direction serve as a respective intermediate layer disposed in between in the outer layers.

This embodiment further leads to advantages regarding the integration of the connecting member within the casting material of the rotor blade since a number of apertures or the like are provided with the connecting member segments and the connecting elements which may be filled with the respective casting material of the rotor blade. Respective sandwich-structures provide the blade root with additional stiffness so that ovalisation and deformation effects may be avoided.

A blade root ring may be attached to at least one face side of the respective connecting members in order to provide the respective connecting members with additional stiffness. The blade root ring serves to connect the respective circumferentially abutting connecting members so that they essentially behave like a closed ring in regard of their mechanical behaviour. Of course, both face sides of the connecting elements may be provided with respective blade root rings so as to further improve the stiffness of the connecting members and the blade root as a whole.

It is possible that at least one face side of a connecting member is provided with a straight shape and/or curved shaped portions. This embodiment mainly refers to respective connecting means in the shape of cylinder-segments, whereby the design of the face side, i.e. the lateral area of a respective connecting member may be provided with respectively shaped designs in the region of its side edge or boarder. Thereby, it is aimed to give the connecting members a geometrical structure allowing a firm form closure with the respective casting material of the rotor blade encasing the connecting members. Hence, respective curved or undercut shaped portions or the like provide a mechanically firm placement or anchoring of the connecting members within the blade root particularly in view of applied shear forces.

Essentially the same effect may be achieved by providing the surface of a connecting member with a three-dimensional structuring, particularly in the shape of axially extending recesses and/or radial holes. Hence, the connection, i.e. adhesion of the connecting members to the casting material of the rotor blade may be enhanced by anchoring the connecting members within the casting material of the rotor blade. It is understood that numerous differently shaped recesses, protrusions, apertures, etc. of a respective connecting member are applicable in this context. The same applies for the respective connecting elements as well as the blade root ring, if need be, i.e. their outer surface may also be provided with a three-dimensional structuring. In an embodiment the surface of a connecting member is at least partially provided with a three-dimensional structuring, particularly in the shape of axially extending recesses and/or radial holes.

The connecting member is preferably made of metal or plastic material, particularly fibre-reinforced plastic material. Generally, it is of advantage to build the connecting member of a casting material such as certain castable metals or plastics allowing a simple manufacturing of respective connecting members, if need be with integrated connecting elements. All kinds of metal and plastic casting materials are applicable, whereby in the latter case fibre-reinforced thermosetting or thermoplastic plastics may be used. Hence, it is even thinkable to manufacture a respective connecting member by injection moulding as long as high performance fibres such as particularly carbon fibres are integrated within the plastic material. The same applies for the respective connecting elements as well as the blade root ring, if need be, i.e. these parts are also preferably made of metal or a plastic material, particularly fibre-reinforced plastic material.

Aside, the present invention relates to a wind turbine, particularly a direct drive wind turbine, comprising a rotor hub having at least one rotor blade attached thereto. The rotor blade is of the type as has been described before.

BRIEF DESCRIPTION OF THE DRAWINGS

In the following, the invention is described in detail as reference is made to the figures, whereby.

DETAILED DESCRIPTION OF INVENTION

Figure 1:
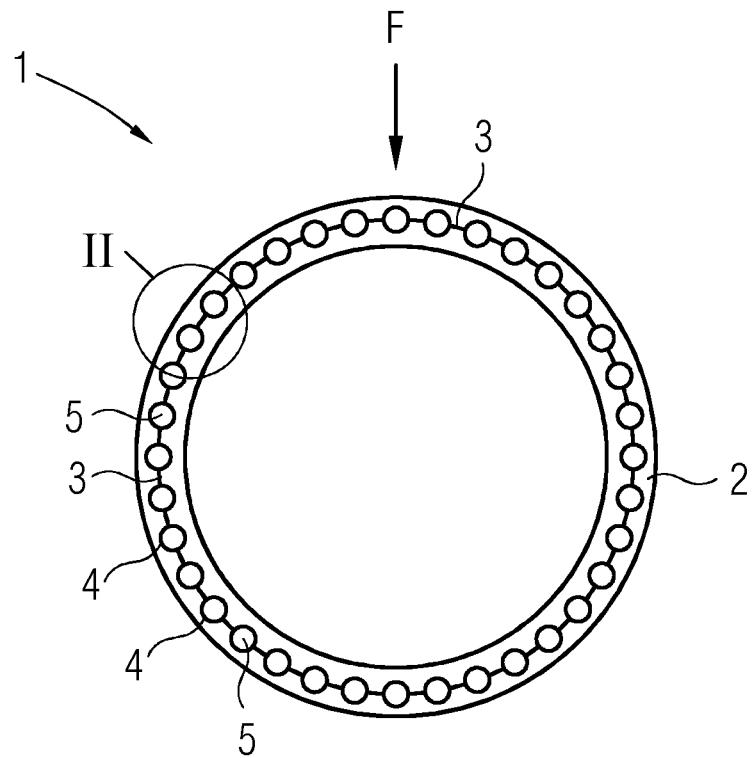
FIG. 1 shows a frontal view of a rotor blade according to an exemplary embodiment of the invention.

FIG. 1 shows a frontal view of a rotor blade 1 according to an exemplary embodiment of the invention. The blade root 2 of the rotor blade 1 comprises connecting members 3 in the shape of two circumferentially aligned half-cylinders each extending about an angle of 180°. As is discernible, the connecting members 3 are disposed in a circumferentially adjacently alignment. The connecting members 3 comprise respective connecting elements 4 each comprising an axially extending connecting portion 5 in the shape of a threaded hole. The connecting portions 5 are adapted to be connected with corresponding connecting portions, i.e. threaded bolts or the like, of a rotor hub of a wind turbine, particularly a direct drive wind turbine (not shown). Hence, the respective connecting elements 4 are connected to respective circumferentially extending connecting members 3 being adjacently disposed in circumferentially direction so as to build a ring-like shape.

Figure 2:
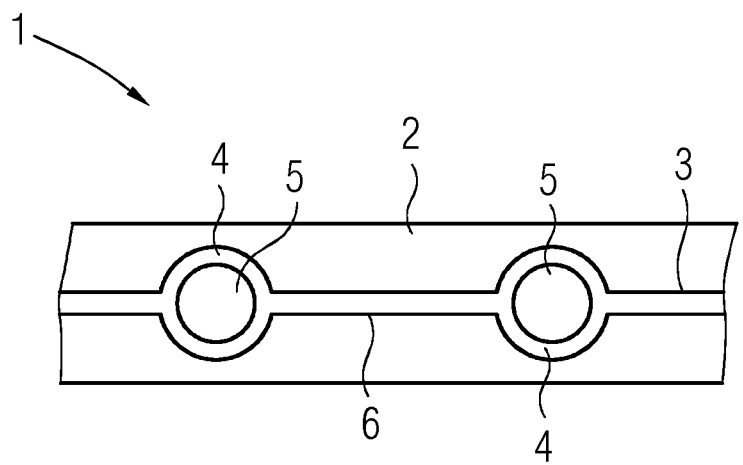
FIG. 2 shows an enlarged detail view of the rotor blade of FIG. 1.
Figure 3:
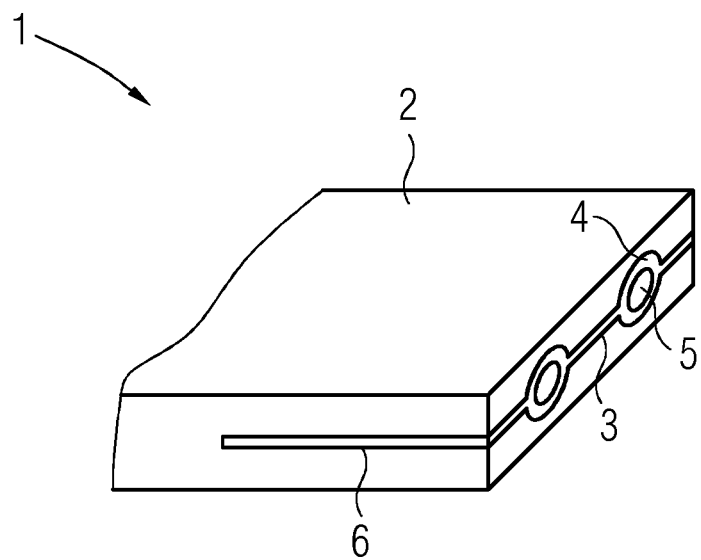
FIG. 3 shows a perspective partial view of a rotor blade according to an exemplary embodiment of the invention.

Thereby, the connecting members 3 are disposed within the fibre-reinforced casting or resin material of the rotor blade 1 (cf. FIG. 2, 3). The respective connecting members 3 are made of a casting material such as a castable metal or a fibre-reinforced plastic material. When using high performance fibres such as carbon fibres the connecting members 3 may even be manufactured by injection moulding. Thus, the connecting members 3 may be built as precast-components giving rise to a reduction of the manufacturing time of a respective rotor blade 1.

The connecting members 3 are particularly advantageous in case of large-scaled rotor blades 1 which are usually manufactured into moulds disposed on top of each other.

The connecting members 3 provide the blade root with mechanical stability, particularly stiffness, so that usually occurring ovalisation or deformation effects of the blade root 2 of the rotor blade 1 are efficiently avoided or at least reduced originating from the self-weight of the rotor blade 1 (cf. force indicating arrow F in FIG. 1).

As is particularly discernible from FIG. 2, the connecting members 3 comprise circumferentially aligned connecting elements 4 axially extending off the respective connecting members 3. The connecting elements 4 may be integrated within or integrally built with respective blade-like or cylinder-segment-like portions 6. Additionally stiffening components such as circular plates or the like are no longer necessary.

Figure 4:
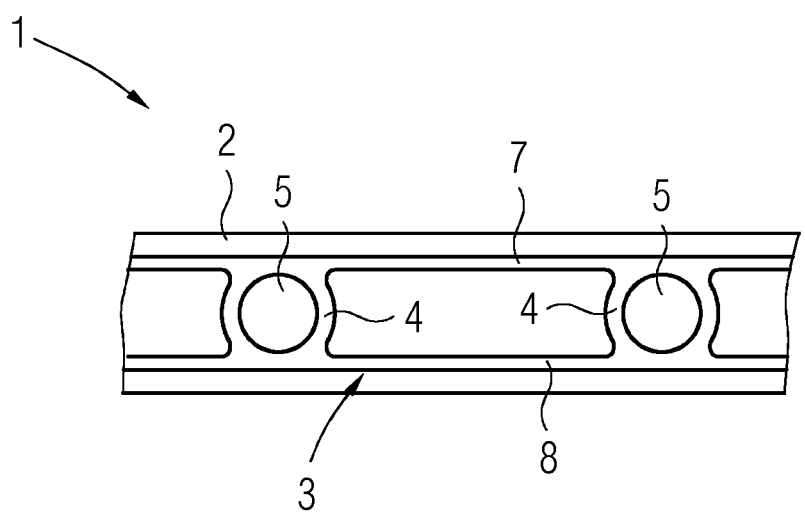
FIG. 4 shows an enlarged detail view of a rotor blade according to an exemplary embodiment of the invention.

FIG. 4 shows an enlarged detail view of the rotor blade 1 according to an exemplary embodiment of the invention. In this embodiment, the respective connecting member 3 comprises two radially spaced connecting member elements 7, 8 each having the shape of respective cylinder-segments. The connecting elements 4 are disposed between the respective connecting member elements 7, 8, i.e. the connecting elements 4 interconnect the connecting member elements 7, 8.

In such a manner, the connecting member 3 comprises a sandwich-construction with the respective connecting member elements 7, 8 serving as respective outer layers and the connecting elements 4 serve as an intermediate layer together with the casting material of the rotor blade 1 filling all respective apertures of the sandwich-construction. The sandwich-construction provides the blade root 2 with additional mechanical stability or stiffness respectively. Particularly, respective forces originated from the self-weight of the rotor blade 1 are counteracted.

Figure 5:
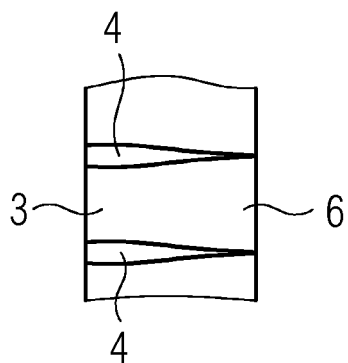
FIG. 5-8 show top partial views of rotor blades according to exemplary embodiments of the invention.

The FIGS. 5-8 show top partial views of rotor blades 1 according to exemplary embodiments of the invention. FIG. 5 shows a connecting member 3 in the shape of a cylinder segment having circumferentially distributed connecting elements 4. Both axial edges and ending of the connecting member are straight cut. As is discernible, the connecting elements 4 extend in axial direction.

Figure 6:
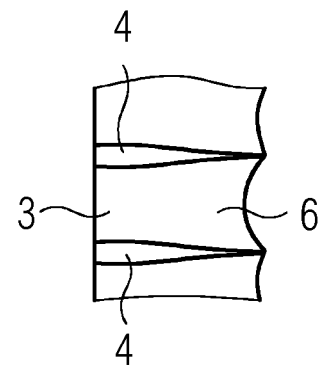
Figure 7:
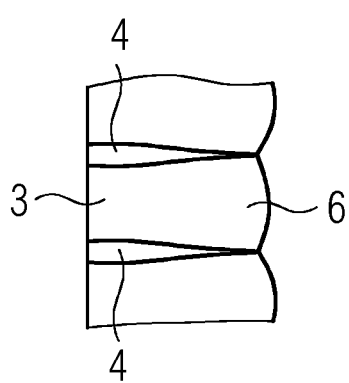

The FIGS. 6, 7 show respective connecting members 3 with their right axial edges or endings having a convex or concave curved shape. In such a manner, the connecting members 3 may be firmly attached within the casting material of the rotor blade 1 particularly in view of shear forces.

Figure 8:
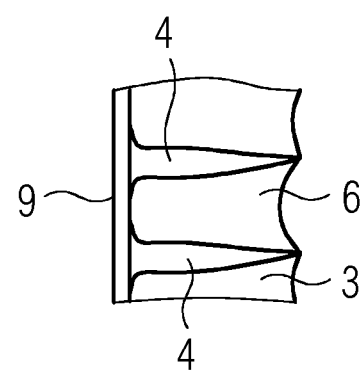

FIG. 8 shows another alternative embodiment which differs from the proceeding embodiments in a blade root ring 9 being attached to the left face side of the respective connecting member 3. The blade root ring 9 is closed so that it provides a circumferential connection of the circumferentially adjacently disposed connecting members 3. Hence, the blade root 2 of the rotor blade 1 is provided with additional mechanical stability. The blade root ring 9 may be deemed in terms of a base plate of the blade root 2.

The connection of the cylinder segment-like portions 6 of the connecting members 3 alternating with respective connecting elements 4 of the embodiments shown in FIG. 5-8 may be interpreted as respective duck feet. In such a manner, respective loads may be distributed over an enlarged area leading to a reduction of the stress and further to an efficient transfer of externally applied loads in the blade root 2 or rotor blade 1 respectively.

Figure 9:
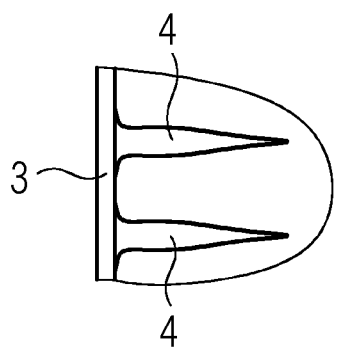
FIG. 9 shows a partial top view of a connecting member according to an exemplary embodiment of the invention.
Figure 10:
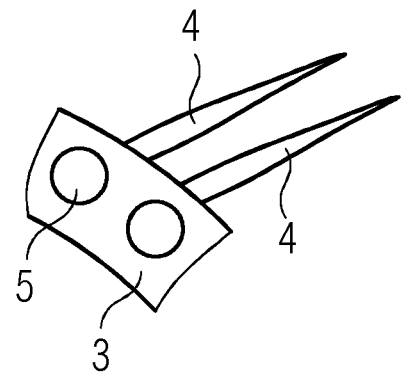
FIG. 10 shows a perspective view of FIG. 9.

FIGS. 9, 10 show a further alternative embodiment of the present invention. In this case, the connecting members 3 is not built as a cylinder segment but as a ring-segment with the connecting elements 4 axially extending of the connecting members 3. It is possible to manufacture a respective connecting member 3 either as an integral component or by firmly attaching respective connecting elements 4 to a respectively shaped connecting member 3.

In either case, the surfaces of the connecting members 3 as well as the connecting elements 4 as well as respective blade root rings 9 (as far as given) may be provided with a three-dimensional structuring, particularly in the shape of axially extending recesses and/or radial holes. In such a manner, the adherence of the casting material of the rotor blade 1, i.e. the connection between the connecting members 3 and the casting material of the rotor blade 1 may be further improved.

While specific embodiments have been described in detail, those with ordinary skill in the art will appreciate that various modifications and alternative to those details could be developed in light of the overall teachings of the disclosure. Accordingly, the particular arrangements disclosed are meant to be illustrative only and not limiting as to the scope of the invention, which is to be given the full breadth of the appended claims, and any and all equivalents thereof.

The invention claimed is:

1. Rotor blade for a wind turbine, comprising:
    an elongate blade base body with a plurality of connecting elements, each connecting element comprising at least one axially extending connecting portion adapted to be connected with at least one corresponding connecting portion of a rotor hub of the wind turbine;
    a plurality of first connecting members, each extending circumferentially and disposed in a circumferential direction at a first radius to build a first ring-like shape at the first radius,
    a plurality of second connecting members, each extending circumferentially and are disposed in a circumferential direction at a second radius to build a ring-like shape at the second radius,
    wherein each connecting element is disposed radially between a respective first connecting member and a respective second connecting member, and
    wherein each first connecting member and second connecting member is made of metal.

2. The rotor blade according to claim 1, wherein each first connecting member and second connecting member has the shape of a cylinder-segment or a ring-segment.

3. The rotor blade according to claim 2, wherein each first connecting member and second connecting member is adapted to transfer externally applied loads in a blade root of the rotor blade.

4. The rotor blade according to claim 3, wherein each first connecting member and second connecting member is adapted to transfer shear loads in the blade root of the rotor blade.

5. The rotor blade according to claim 2, wherein each first connecting member and second connecting member has the shape of a half-cylinder-segment or a half-ring-segment.

6. The rotor blade according to claim 1, wherein the connecting elements are integrally built with a respective first connecting member or mounted to a respective first connecting member.

7. The rotor blade according to claim 6, wherein each connecting element is integrally built with a respective first connecting member by way of casting.

8. The rotor blade according to claim 6, wherein each connecting element is welded to the respective first connecting member.

9. The rotor blade according to claim 6, wherein each connecting element is bolted to the respective first connecting member.

10. The rotor blade according to claim 1, wherein a blade root ring is attached to at least one face side of the respective first and second connecting members.

11. The rotor blade according to claim 1, wherein at least one side of a connecting member is provided with a straight shape and/or curved shaped portions.

12. The rotor blade according to claim 1, wherein at least the surface of a first connecting member and/or the surface of a second connecting member is at least partially provided with a three-dimensional structuring.

13. The rotor blade according to claim 12, wherein the three-dimensional structuring is in the shape of axially extending recesses and/or radial holes.

14. The rotor blade according to claim 1, wherein each first connecting member and second connecting member is made of steel.

15. The rotor blade according to claim 1, wherein the axial edge of each first connecting member is convex or concave shaped.

\* \* \* \* \*